March 25, 1958 G. E. HENRY 2,827,978
ACOUSTIC RADIATION FORCE MEASURING DEVICE
Filed May 31, 1955
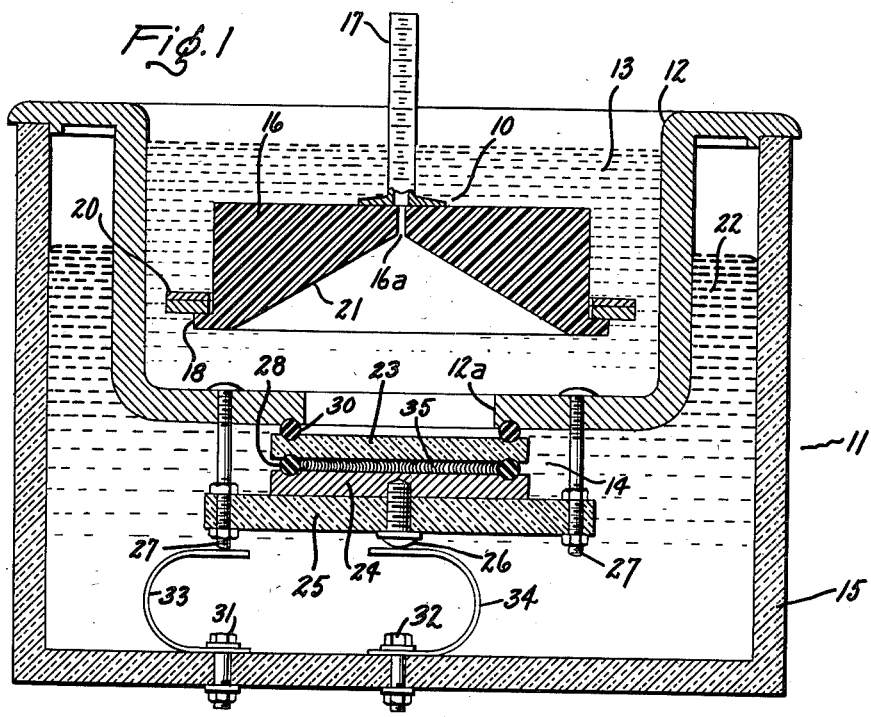
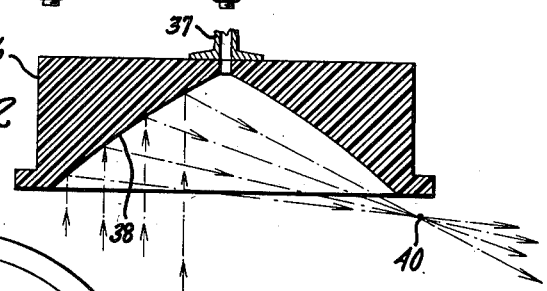
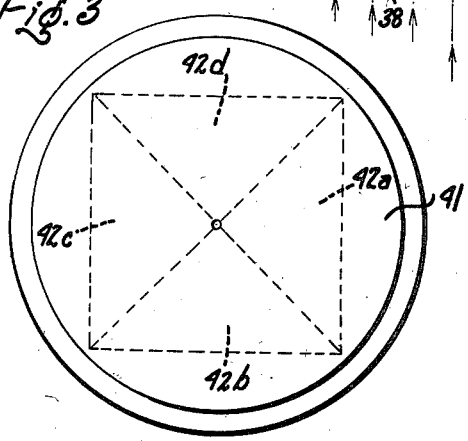
Inventor
George E. Henry
by Merton D. Moore
His Attorney United States Patent Office 2,827,978
Patented Mar. 25, 1958

2,827,978

ACOUSTIC RADIATION FORCE MEASURING DEVICE

George E. Henry, Schenectady, N. Y., assignor to General Electric Company, a corporation of New York Application May 31, 1955, Serial No. 512,053

6 Claims. (Cl. 181—.5)

This invention relates to a device for measuring the radiation force exerted in a liquid by acoustic waves.

In the field of acoustic research and applications, it is often necessary to measure the output of an acoustic wave generator and the strength of the resulting acoustic field, but such measurements are generally quite difficult to make. There are numerous physical quantities that may be of interest, among which are acoustic intensity, sound energy density, sound pressure, acoustic radiation pressure, acoustic radiation force and various others well known to those skilled in the art. Of course, interrelationships exist among these quantities whereby, when certain of the quantities are known, others may be calculated. One of the most useful quantities is the acoustic radiation force from which several other quantities such as acoustic radiation pressure and sound pressure may be derived. Accordingly, a primary object of the present invention is to provide a device for making that measurement.

Another object is to provide an acoustic radiation force measuring device which is a self-contained unit that requires no external connections or accessories and is adaptable to measure such forces over a wide range of values.

A further object of the invention is to provide such a device which is self-centering; that is, when the device is subjected to acoustic radiation, it centers itself in the area of maximum radiation density.

An acoustic radiation force measuring device constructed in accordance with the invention comprises a block-like body and an upwardly extending stem attached to the upper surface of the body. The body has a generally concave reflecting surface formed on its lower portion upon which impinges the acoustic radiation which it is desired to measure.

The acoustic radiation force measuring device is so constructed that when it is placed in a liquid-filled container into which acoustic waves are to be transmitted, the device sinks to the bottom of the container. When acoustic radiation is transmitted upwardly into the liquid, it drives the measuring device upwardly from the bottom of the container toward the surface of the liquid. Depending upon the force of the acoustic radiation, the measuring device seeks an equilibrium position with part of the stem projecting above the surface of the liquid such that the upward force due to the radiation pressure equals the downward force due to the weight of the device. The stem of the device may be calibrated to indicate the radiation force of the acoustic waves incident on the device.

In the preferred embodiments of the invention, the reflecting surface on the body of the device is so formed that the device centers itself horizontally in the beam of acoustic radiation and maintains itself in that position.

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawing, in which Fig. 1 is a vertical sectional view of an embodiment of the invention in use in a conventional ultrasonic generator;

Fig. 2 is a vertical sectional view of another embodiment of the invention; and

Fig. 3 is a plan view illustrating further modifications of the invention.

Fig. 1 illustrates an acoustic radiation force measuring device 10 constructed in accordance with the invention in use in a conventional ultrasonic acoustic wave generator 11 of a type readily available commercially. The ultrasonic generator 11 comprises an inner container 12 substantially filled with a liquid 13 into which are transmitted the acoustic waves whose radiation force is to be measured. The acoustic waves are provided by a transducer assembly, indicated generally by the numeral 14, contained within an outer container 15. The ultrasonic acoustic waves are transmitted from the transducer 14 upwardly into the liquid 13 through an aperture 12a in the bottom of the inner container 12. The ultrasonic generator will be described in more detail hereafter.

The acoustic force measuring device 10 comprises a block-like body 16 having a hollow stem 17 secured to its upper surface. The body 16 of the device preferably is constructed of a material having a density slightly less than the density of the liquid in which the measurements are to be made, and having a finite reflectance for acoustic radiation impinging thereon. Various materials are suitable for such use, among them being wood, foamed silicone plastic, polyester resin containing air bubbles, and various other materials. If it is inconvenient to use a material whose density is less than that of the liquid, a heavier material may be used and air pockets provided therein to give the required overall density characteristics.

The stem 17 of the device may be made of any suitable material whose density is greater than that of the liquid in which the device is used. Glass tubing has been found to be quite suitable.

In order to cause the radiation force measuring device to sink to the bottom of the liquid-filled container 12 when acoustic radiation is not being transmitted into the liquid, the body 16 is provided with a flange 18 on which weighting rings 20 may be placed. The weighting rings serve to stabilize the device against tipping and also serve as convenient calibration means in that rings of various weights may be used to make the acoustic force measuring device adaptable to measure forces of widely differing values. Of course, the weighting rings 20 may be made of any suitable material whose density is greater than that of the liquid 13. Some additional stability against tipping may be obtained by providing a rack extending below the body 16 for the weighting rings rather than having them rest on the flange 18.

The under side of the force measuring device 10 is provided with a concave conical reflecting surface 21 on which the acoustic radiation to be measured impinges. A passage 16a is provided through the body 16 at the vertex of the conical surface 21 to permit entrapped gas and vapor to escape through the stem 17. In the embodiment of the invention shown in Fig. 1, the surface 21 lies at an angle to the horizontal of approximately 30 degrees. However, as will be pointed out hereafter, other types of surfaces making various angles with the horizontal may be used.

In operation, the acoustic waves generated by the ultrasonic generator 11 impinge upon the reflecting surface 21 of the device and drive the device upwardly until an equilibrium position is reached. That position is reached when the stem 17 is projecting above the surface of the liquid a sufficient amount so that the downward force due to the weight of the device equals the upward force exerted by the incident acoustic radiation. The stem may have a scale marked thereon which may be calibrated in terms of acoustic radiation force expressed in dynes, decigrams, or other convenient units.

The preferred form of the device of the invention embodies self-centering characteristics such that when the device is placed in a liquid-filled container and acoustic radiation is transmitted into the container from the bottom, the force measuring device centers itself with respect to the symmetrical beam of radiation, as is shown in Fig. 1. It has been found that this occurs when the surface 21 has an inclination to the horizontal of 30 degrees or less.

When acoustic radiation impinges obliquely upon a surface, such as the conical surface 21, the radiation exerts force upon that surface, one component of the force acting in a horizontal direction to tend to drive the surface outwardly. If the radiation is so reflected that it again impinges on the surface at a point opposite from the first point of impingement, there is another component of horizontal force which acts in the opposite direction from and hence cancels the first component. Thus there is no horizontal stability, and the force measuring device moves about horizontally in the liquid-filled container. Stability or self-centering may be imparted to the device by arranging the oblique surface at an angle such that all of the acoustic radiation impinging thereon is reflected only once, and there are no repeated reflections between opposite points of the surface. This occurs if surface 21 makes an angle with the horizontal of 30 degrees or less. In that case, the radiation impinging on each portion of the surface is reflected downwardly and outwardly and does not impinge on any other portion of the surface. In that case, the acoustic radiation incident on each portion of the conical surface 21 has a horizontal component of force that tends to drive the surface (and hence the device) outwardly from the center of the beam of radiation. When the conical surface 21 is not centered in the beam of radiation, the horizontal forces exerted on the surface vary from one portion to another and tend to move the device horizontally until the force acting on all portions of the surface in each horizontal plane therethrough are equal in magnitude. When that condition exists, the device is centered over the beam of radiation.

As previously mentioned, the force measuring device of the invention is illustrated as being used to measure the acoustic radiation force in the liquid-filled container 12 of a conventional ultrasonic generator 11. The construction and operation of such generators are well known to those skilled in the art and so will not be described in detail. Briefly, the ultrasonic generator compries an inner container 12 substantially filled with an electrically conductive liquid 13. The transducer assembly 14 is located within an outer container 15 constructed of an insulating material and filled with a dielectric fluid 22 to a level above the transducer assembly.

The transducer assembly 14 includes a piezoelectric or electrostrictive element 23 mounted in alignment with the opening 12a in the bottom of the inner container 12 to transmit acoustic waves upwardly into the liquid 13. The mounting for the element 23 comprises an electrically conductive plate 24 secured by a screw 26 to a supporting plate 25 made of an insulating material, and the supporting plate 25 is secured to the inner container by means of bolts 27. Rubber or plastic O rings 29 and 30 serve as gaskets to prevent the liquids 13 and 22 from intermixing.

Electrical connections to the apparatus are made through screws 31 and 32 which extend through the bottom of the outer container 15. Leaf springs 33 and 34 are secured to screws 31 and 32, respectively, and contact one of the bolts 27 and the screw 26, respectively. The screws 31, 32 may be connecetd to the output of a conventional electronic alternating current generator (not shown) to energize the apparatus. Preferably, the screw 31 is connected to the grounded side of the alternating current generator and screw 32 is connected to the high potential side. The path of current flow includes screw 32, spring 34, screw 26, a copper wire pad 35 interposed between plate 24 and the element 23, the element 23, electrolytic liquid 13, inner container 12, one of the bolts 27, spring 33 and screw 31.

It is pointed out that the ultrasonic generator 11 forms no part of the present invention and is illustrated only to show a typical use of the acoustic force measuring device of the invention.

Fig. 2 illustrates a form of the radiation force measuring device of the invention which differs from that shown in Fig. 1 in the shape of its reflecting surface. The device comprises a block-like body 36 provided with a stem 37 that may be made of the same materials as the corresponding parts of the embodiment of the invention previously explained. The body 36 is provided with a concave paraboloidal reflecting surface 38, which differs from an ordinary parabolic surface of revolution in that a generating parabolic segment of appropriate length is rotated not around the axis of the parabola but rather around a line parallel to the axis, in the plane of a parabola, and spaced therefrom by a distance equal to the distance between the focus and the vertex of the parabola. It is understood that the surface may be generated by rotating a parabola about other lines, but the particular embodiment shown and described is preferred because it provides a maximum of self-centering action.

It can be shown mathematically that acoustic radiation directed upwardly against the paraboloidal surface 38 is reflected and focused in a ring as at 40 concentric with the vertical axis of the measuring device. With the paraboloidal surface generated as described, the angle of inclination to the horizontal of all portions of the surface may be made to be less than 45 degrees. With such a surface, all reflected radiation just misses the opposite portion of the surface to focus in a ring very close to the outermost edge of the surface. Thus, the horizontal components of the forces exerted by the impinging acoustic wave move the device until the forces acting in all horizontal directions are equal. At that time, the device is centered over the acoustic beam.

If the maximum angle of inclination of the various portions of the surface is increased beyond 45 degrees, the once reflected radiation may be reflected a second time from another portion of the surface, so that the horizontal components of force cancel each other, as previously explained. Thus, the self-centering action may be materially decreased or lost entirely.

The embodiments of the invention shown in Figs. 1 and 2 represent two extremes between which the self-centering feature is incorporated into the device. For example, with a conical surface the radiation is not focused but is merely reflected, and the force resulting from a single ideal ray tending to center the device is essentially constant for any finite displacement from center within the range of the surface. Radiation reflected from a paraboloidal surface may be focused in a ring very close to the outer edge of the surface. Such a surface provides the optimum in self-centering because the farther the device is displaced from the center, the greater is the force exerted thereon by a single ideal ray to return it to the center. This occurs because rays impinging on the surface near its rim are reflected at a quite flat angle and exert a large horizontal force thereon. Lying between these two extremes are variously shaped surfaces, such, for example, as a surface generated by revolving an arc of a circle about a line through one end of the arc, a simple concave spherical surface or a conventional parabolic surface. Such surfaces provide some self-centering but not to the extent of the special paraboloidal surface described.

It has been found that the concave reflecting surface on the acoustic force measuring device need not be a surface of revolution. Quite satisfactory results may be obtained from a reflecting surface comprising a plurality of segments. Fig. 3 illustrates in plan view a form of the device comprising a body 41 having a reflecting surface formed of four segments 42a, 42b, 42c and 42d arranged in a pyramidal shape. Each of the segments 42a . . . 42d may be of any desired curvature, as previously pointed out with reference to the embodiments shown in Figs. 1 and 2. For example, each segment may be a plane which is triangular in shape, or each segment may be curved in a parabolic arc similar to the arc which is rotated to form the surface of revolution of the embodiment shown in Fig. 2. In order to obtain the self-centering feature the same condition as to avoiding multiple reflections of the acoustic waves must be met by the segmented surfaces as is met by the surfaces of revolution. Thus, in the case where each of the segments is a plane surface, the angle of the plane with the horizontal should be not more than 30 degrees. When each of the segments has a special paraboloidal shape, similar to that described with reference to Fig. 2, the conditoin is met when the maximum angle of inclination of any portion thereof does not exceed 45 degrees.

It is now apparent that the device of the invention fulfills the objectives set forth and provides an acoustic radiation force measuring device that is self-contained and requires no external connections or accessories. The device is adaptable to measure a wide range of acoustic radiation forces and, in its preferred form, incorporates the self-centering feature. Although several embodiments of the invention have been illustrated, many modifications may be made; and it is intended by the appended claims to cover all such modifications as fall within the true spirit and scope of the invention.

What I claim as new and desire to secure by Letters Patent of the United States is:

1. A device for measuring acoustic radiation force in a liquid comprising a block-like body having a density less than the density of said liquid, weighting means carried by said body for causing said body to sink in said liquid in the absence of acoustic radiation therein, a concave acoustic radiation reflecting surface of revolution formed on said body on which said acoustic radiation impinges to tend to drive said body upwardly through said liquid, all portions of said concave reflecting surface having inclinations to the horizontal of less than approximately 45 degrees, and a hollow stem extending upwardly from said body with a communicating passage extended through said body to the vertex of said surface to permit escape of gases trapped by said surface, said stem having a density greater than the density of said liquid.

2. A device for measuring acoustic radiation force in a liquid comprising a block-like body having a density less than the density of said liquid, weighting means carried by said body for causing said body to sink in said liquid in the absence of acoustic radiation therein, a concave conical acoustic radiation reflecting surface formed on said body on which said acoustic radiation impinges to tend to drive said body upwardly through said liquid, said concave conical reflecting surface having an inclination to the horizontal of less than approximately 30 degrees, and a hollow stem extending upwardly from said body with a communicating passage extended through said body to the vertex of said surface to permit escape of gases trapped by said surface, said stem having a density greater than the density of said liquid.

3. A device for measuring acoustic radiation force in a liquid comprising a block-like body having a density less than the density of said liquid, weighting means carried by said body for causing said body to sink in said liquid in the absence of acoustic radiation therein, acoustic radiation reflecting surface of revolution formed on said body on which said acoustic radiation impinges to tend to drive said body upwardly through said liquid, said surface of revolution being generated by a segment of a parabola rotated about a line parallel to its axis and in the plane of the parabola, and a stem extending upwardly from said body, said stem having a density greater than the density of said liquid.

4. A device for measuring acoustic radiation force in a liquid comprising a block-like body which sinks in said liquid in the absence of acoustic radiation therein, a concave acoustic radiation reflecting surface of revolution formed on said body on which said radiation impinges to tend to drive said body upwardly through said liquid, said surface of revolution being generated by a segment of a parabola rotated about a line parallel to its axis and in the plane of the parabola, all portions of said concave paraboloidal reflecting surface having inclinations to the horizontal of less than approximately 45 degrees, and a stem extending upwardly from said body.

5. A device for measuring acoustic radiation force in a liquid comprising a block-like body having a density less than the density of said liquid, weighted means carried by said body for causing said body to sink in said liquid in the absence of acoustic radiation therein, a concave acoustic radiation reflecting surface of revolution formed on said body on which said acoustic radiation impinges to tend to drive said body upwardly through said liquid, said surface of revolution being generated by a segment of a parabola rotated about a line parallel to its axis and in the plane of the parabola, all portions of said concave paraboloidal reflecting surface having inclinations to the horizontal of less than approximately 45 degrees, and a stem extending upwardly from said body, said stem having a density greater than the density of said liquid.

6. In a device for measuring acoustic radiation force in a liquid, the combination comprising a block-like body having a density less than that of said liquid, said body including a concave acoustic radiation reflecting surface characterized as a surface of revolution generated by a segment of a parabola rotated about a line parallel to the axis and in the plane of the parabola with all portions of said surface inclined less than approximately 45 degrees with respect to a face of said block, weighting means mounted on said body to present said surface toward a source of said acoustic radiation in said liquid and to lower said body into said liquid, a hollow stem mounted on said body with a communicating passage extended through said body to the vertex of said surface to permit escape of gases trapped by said surface.

References Cited in the file of this patent

UNITED STATES PATENTS

| 1,074,039 | Berberich | Sept. 23, 1913 |
| 2,049,766 | Glen | Aug. 4, 1936 |
| 2,052,550 | Alder | Sept. 1, 1936 |
| 2,622,439 | Copper | Dec. 23, 1952 |

FOREIGN PATENTS

| 120,659 | Great Britain | Nov. 21, 1918 |
| 892,516 | Germany | Oct. 8, 1953 |

OTHER REFERENCES

Bernhardt: "Effect of Ultrasound on Thermoplastic Melts," Industrial and Engineering Chemistry, vol. 46, April 1954, pages 742–746.